United States Patent [19]

Hutta et al.

[11] 4,161,826

[45] Jul. 24, 1979

[54] METHOD OF DEAGGLOMERATION OF ALUMINUM POWDER

[75] Inventors: Joseph J. Hutta, Groton; Kenneth P. Quinlan, Newton, both of Mass.

[73] Assignee: The United States of America as represented by the Secretary of the Air Force, Washington, D.C.

[21] Appl. No.: 884,881

[22] Filed: Mar. 9, 1978

[51] Int. Cl.² ............................................. F26B 7/00
[52] U.S. Cl. ............................................. 34/12; 34/9
[58] Field of Search ........................................ 34/9, 12

[56] References Cited

U.S. PATENT DOCUMENTS 1,674,230  6/1928  Seyfferth .................................. 34/9

Primary Examiner—John J. Camby
Attorney, Agent, or Firm—Joseph E. Rusz; William J. O'Brien

[57] ABSTRACT

A method for deagglomerating finally divided aluminum metal powders by allowing said metals powders to remain in contact with water heated to room temperature for approximately 30 hours.

2 Claims, 1 Drawing Figure

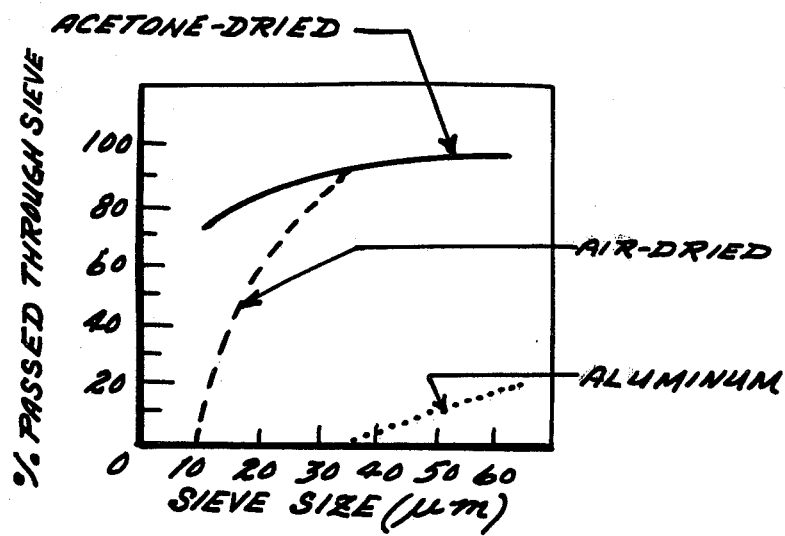

METHOD OF DEAGGLOMERATION OF ALUMINUM POWDER

STATEMENT OF GOVERNMENT INTEREST

The invention described herein may be manufactured and used by or for the Government for governmental purposes without the payment of any royalty thereon.

BACKGROUND OF THE INVENTION

This invention relates to finely divided aluminum powders. More particularly, this invention relates to a method for the deagglomeration of aluminum powders by modifying the surfaces thereof through chemical means in order to reduce their surface energy.

Finally divided aluminum metal particles, especially in the range of from 2 to 5 micrometers tend to agglomerate and cake to such an extent that their free-flow characteristics are severely impaired. The free-flow characteristic of aluminum powders is necessary in order to improve its dispersibility in the industrial processes which find it to be a value. The powder particles tend to agglomerate by weak interaction in order to form clusters which usually exhibit a size greater than 35 micrometers. Interactions of this type arise from non-specific attractive forces which can usually be described in terms of van der Waals forces and electrostatic attraction. The aggregation of aluminum particles may also involve small contributions from metallic as well as hydrogen bonds. These attractive forces which exist between aluminum particles can be described by the following relationship:

$$F = A(d_1 d_2 / d_1 - d_2) \quad (1)$$

Where A is a constant independent of the dimensions of the spherical particles and $d_1$ and $d_2$ represent the diameters of the 2 solid spheres. The letter A encompasses the number of attracting atoms on the spheres, the van der Waals constant, and the distance between the centers of the surface molecules or atoms of the two spheres. Electrostatic forces are considered to be a minimum in this size range. In similar studies, electrostatic contributions were found to be less than 9 percent.

Although molecular or van der Waals forces are generally considered to be weak forces, they can nonetheless be considerable between micrometer sized particles at very short distances. Evidence of this is provided by the observation that aluminum powder dispensed from evacuated canisters exhibits a greater agglomerative tendency than powder that has not been subjected to vacuum treatment. It was theorized, therefore, that the removal of naturally adsorbed atmospheric gases enhances interparticle attraction by permitting closer contact.

Since it appears that prevention of agglomeration may be a matter of shielding of one particle from another, a research effort was conducted in an attempt to modify the surfaces of the aluminum spheres in order to reduce the attraction between them. As a result, it was found that surfaces modifications could be accomplished by treating the aluminum powders with water followed by air drying or drying in acetone. This procedure improved to a substantial degree the free-flow characteristics of finely divided aluminum metal powders; especially those powders in the micrometer sized range.

SUMMARY OF THE INVENTION

In accordance with this invention it has been found that the free flowing characteristics of micrometer sized aluminum metal powders can be significantly improved by a process in which the aluminum powders are first admixed with water and then air dried or acetone dried. The materials prepared by this novel procedure have been evaluated through a sieve analysis which compares untreated powders with the powders of this invention. The results clearly show that the water treated aluminum powders possess excellent dispersibility characteristics with over 70 percent of the particles less than 10 micrometers in diameter as compared with untreated aluminum particles which tend to agglomerate in clumps having a size in excess of 35 micrometers.

Accordingly, the primary object of this invention is to provide a method for effecting the deagglomeration of finely divided aluminum metal powders.

Another object of this invention is to provide a method for improving the free-flow characteristics of finely divided aluminum metal powders having a diameter ranging in size from about 2 to 5 micrometers.

Still another object of this invention is to provide a method for fluidizing metal powders thereby enhancing their utilization in a wide variety of industrial applications.

The above and still further object and advantages of this invention will become more readily apparent upon consideration of the following detailed description thereof when taken in conjunction with the accompanying drawing.

DESCRIPTION OF THE DRAWING

In the drawing:

The FIGURE in the drawing represents a graphical illustration showing the classification of air-dried and acetone-dried, water-treated aluminum metal powders in comparison with an untreated aluminum metal powder.

DESCRIPTION OF THE PREFERRED EMBODIMENTS

Finely divided aluminum metal powders, especially those in the size range of from about 2 to 5 micrometers in diameter, are useful for a number of industrial applications. For example, it is well known that spherical aluminum particles in the micron size range will produce a distinct optical signature in the LWIR spectral regions and, therefore, are especially useful as optical countermeasure materials. Unfortunately, it is been found that the full potential of aluminum particles as a countermeasure material cannot be realized due to the tendency of aluminum powders to agglomerate and cluster to such an extent that their free-flow properties are essentially destroyed. In order to utilize aluminum powders in a countermeasure system, therefore, it is necessary to utilize an expensive dispenser especially designed to overcome the problems of clumping and agglomeration. It is obvious, therefore, that if a method for enhancing the free-flow characteristics of aluminum could be found, then aluminum powders could be effectively dispersed using an inexpensive dispenser of relatively simple design.

With the above problem in mind, a research effort was commenced in an attempt to alter or modify the surfaces of aluminum powders in order to reduce their surface energy thereby shielding one particle from another in order to prevent agglomeration. The research effort resulted in the development of a method for increasing dispersibility of aluminum metal powders by treating the powders with water. The powdered particles were admixed with water and allowed to remain in contact therewith at room temperature for about 30 hours. The water treated aluminum was either air dried; or subjected to several acetone washings to extract the water and then dried in a thin layer in a large-area tray. The directly air dried aluminum formed a hard cake due to oxide bridging of particles and required moderate grinding to reduce the resulting aggregates to a powder. On the other hand, the acetone treated aluminum dried to a free flowing condition requiring no grinding or further processing and was a superior product. The aluminum was then processed into a fine powder by gently tapping with a pestle.

The treated aluminum powders were evaluated by sieve analysis as shown in the FIGURE in the drawing. In order to insure that the results would be directly applicable to the agglomeration problem, the aluminum powder used in the present invention was obtained from the same source and subjected to size separation or classification procedures by the same processor. The spherical particles were formed by atomization of molton aluminum in a helium gas jet. A 2 to 5 micrometer fraction was separated from the production run powder with the use of an Acucut particle classifier. Plotting cumulative percentage frequencies against particle size showed that 71 percent of the particles were between 2 and 5 micrometers in diameter. Evaluation of the agglomeration technique of this invention was accomplished by sieve analysis. The sieve analyses were performed with the use of a model L3P Allen-Bradley Sonic Sifter fitted with a set of precision sieves consisting of 63, 37, 20, and 10 micrometer sized sieves. Particles less than 10 micrometers in diameter were received in the fines collector. The quantity of powders received in the collector is a criterion of the effectiveness of the deagglomeration treatment of this invention. The greater the quantity of powder passing through to 10 micrometer sieve, the better the deagglomeration treatment is rated. The results of a sieve analysis test are presented in graphical form in the FIGURE of the drawing, with the sieve size in micrometers as the abscissa and the percentage of particles less than a given sieve size as the ordinate.

As was stated heretofore the finally divided aluminum particles ranging in size from 2 to 5 micrometers were allowed to remain in contact with water at room temperature for about 30 hours. The same effect could be obtained in a shorter time by heating the mixture gently for approximately one half hour and allowing the mixture to react overnight. The water-treated aluminum was then either directly air-dried; or subjected to several acetone washings to extract the treatment water and then dried in air in a thin layer in a large-area tray. The directly air-dried aluminum formed a hard cake due to oxide bridging of particles and required moderate grinding to reduce the resulting aggregate to a powder. On the other hand, the acetone-treated aluminum dried to a free flowing condition which required no grinding or further porcessing. The aluminum was processed into a fine powder by gently tapping with a pestle. It was a far superior product with over 70 percent of the particles less than 10 micrometers in diameter.

The deagglomeration treatment of this invention modified the surface of the aluminum spheres having dispersibility characteristics significantly better than that of an untreated aluminum powder. The water treatment resulted in the formation of a continuous thin oxide film on the surface of the aluminum spheres. This is in contrast to the discontinuous, flaky film which forms spontaneously on aluminum powders under environmental conditions. Initially, the treated powder was spread in a thin layer in a large flat tray and air dried. However, this was found to result in hard caking that necessitated moderate pounding and grinding in a mortor to break the product down into a free-flowing powder. Apparently, this problem was caused by water bridging between particles which promoted the formation of oxide bridging by the time the drying process was completed. To prevent this, the water was removed immediately following the reaction phase by successive acetone washes. The powder was then spread over the flat tray and air dried for approximately one hour. The resulting product was a completely free-flowing powder requiring no further treatment.

A particle size analysis on the material dried by both methods is shown in the FIGURE of the drawing. The FIGURE shows that the water-treated aluminum washed with acetone gives an aluminum powder of excellent dispersibility with over 70 percent of the particles less than 10 micrometers in diameter. On the other hand, the directly air-dried aluminum powder had less than 10 percent of the particles below 10 micrometers. The reason for this is that the necessary grinding step is not completely effective in breaking down the aggragates formed by oxide bridging.

The improved dispersibility of the water treated aluminum powders of this invention may be due to the continous oxide film which prevents metal-to-metal contact and the resulting attraction by cohesive forces that typically exist between metallic spheres. This is only partially accomplished in the case of aluminum particles with a naturally formed discontinuous oxide film, where a considerable number of particles may make metal-to-metal contact.

A contribution may also be due to the possibility that because the natural film formed by adsoption of oxygen from the atmosphere is very thin on the order of several angstroms in thickness, it may be inadequate for screening the forces of attraction. Also, with a very thin oxide film, the aluminum spheres can still deform at the interparticle contact to form a large area contact resulting in increased adhesion and subsequent agglomeration. It is also pointed out that the increased hardness or regidity inparted to aluminum spheres by the 50 to 100 angstrom-thick aluminum oxide film formed by the controlled reaction method of this invention would limit this deformation, thereby promoting a decrease in interparticle adhesion and improvement in dispersibility.

From a consideration of the foregoing, it can readily be seen that the present invention provides a method which significantly enhances the free flow characteristics of aluminum metal particles in the micrometer size range. The invention solves the problem of obtaining a free flow aluminum powder. Prior to this invention aluminum particles could not be maintained in a free-flow condition since the particles would agglomerate with each other. This procedure, however, maintains the aluminum powder in this desired micrometer size range, thereby allowing the utilization of the aluminum powder to its fullest potential as an optical countermeasure agent or as an obfuscating material.

While the principles of this invention have been described with particularity, it should be understood by those skilled in the art that various alterations and modifications can be made without departing from the spirit and scope thereof and that all such modifications as fall within the scope of the appended claims is intended to be included herein.

What is claimed is:

1. A method for the deagglomeration of micrometer-sized aluminum metal powders which comprises the steps of
   (1) admixing said powders with water;
   (2) allowing said powders to remain in contact with said water at room temperature for a period of time of about 30 hours; and
   (3) air-drying the resulting water-treated aluminum powder.
2. A method in accordance with claim 1 wherein said water-treated aluminum powder is washed with acetone prior to air-drying said powder.